Sept. 10, 1963    H. W. BOYLAN ET AL    3,103,155
DIRECTIONAL BALL NOZZLE ARRANGEMENT
Filed Sept. 13, 1960

INVENTORS
Henry W. Boylan &
BY Elbert E. Haight

George E. Johnson
ATTORNEY

United States Patent Office 3,103,155
Patented Sept. 10, 1963

3,103,155
DIRECTIONAL BALL NOZZLE ARRANGEMENT
Henry W. Boylan and Elbert E. Haight, Flint, Mich., assignors to General Motors Corporation, Detroit, Mich., a corporation of Delaware
Filed Sept. 13, 1960, Ser. No. 55,785
1 Claim. (Cl. 98—40)

This invention relates to air nozzles and more particularly to nozzle arrangements for directing air in a selected general direction for ventilation or air-conditioning of enclosed spaces such as the passenger compartments of vehicles.

In admitting air from a blower into a vehicle passenger compartment it is desirable to be able to select or change the angle of air admission and to direct a substantial volume of air best to suit individual requirements. This should be possible without creating too well defined or concentrated streams of air which would objectionably be felt by the passengers. Obviously, it is no great problem merely to diffuse the air as admitted by using multiple inlets or pivoted vanes. Such expedients will create diffusion but their use should not be accompanied by inconvenience in adjusting the general direction of air flow or by any cumbersome bulk of the nozzle arrangements employed.

An object of the present invention is to provide an improved and compact nozzle arrangement which is capable of adjustment for effecting a selection of general discharge direction to a diffused flow of a large volume of air.

A feature of the present invention is a nozzle arrangement comprising a segment of a sphere defining a main passage with a circular cross-section and having vanes with flat surfaces and traversing the passage to define at least two discharge passages extending in parallel and one discharge passage extending obliquely from the axis of the main passage.

These and other important features of the invention will now be described in detail in the specification and then pointed out more particularly in the appended claims.

Figure 1:
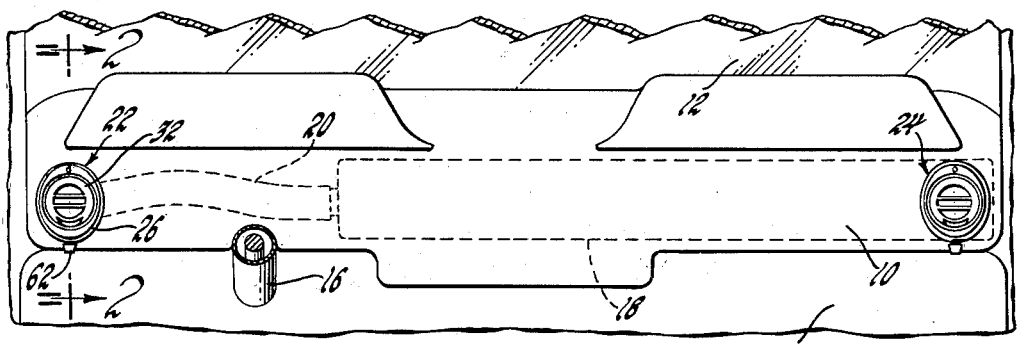
FIGURE 1 is an elevation view of an instrument panel of an automobile, two nozzle arrangements being shown thereon and each being an embodiment of the present invention.
Figure 2:
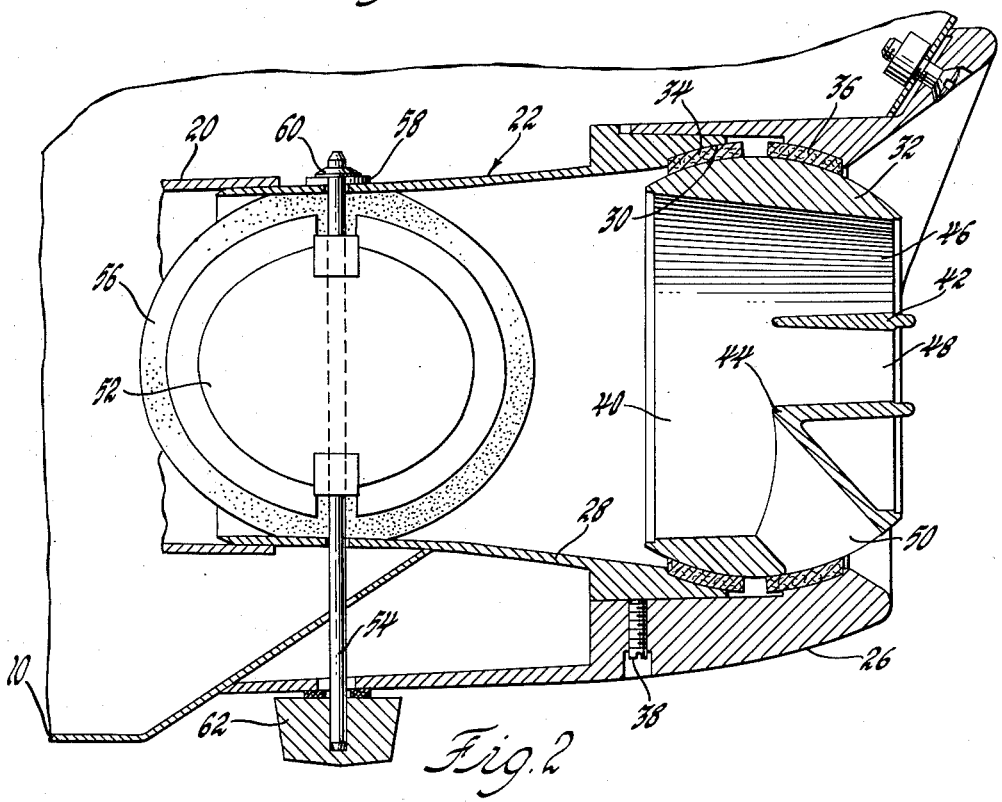
FIGURE 2 is an enlarged sectional view taken along the line 2—2 in FIGURE 1.
Figure 3:
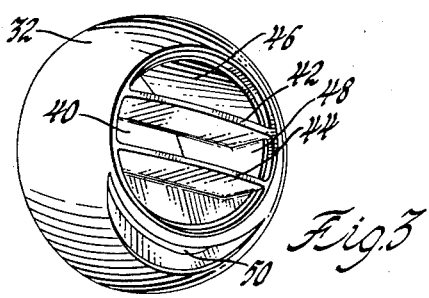
FIGURE 3 is a perspective view of a nozzle per se as used in the assembly of FIGURE 2 but drawn to a smaller scale.

An automobile instrument panel 10 is shown in FIGURE 1 as placed in conventional association or relation with a windshield 12, a toe board 14, and a steering column 16. Concealed by the panel 10 is an elongated air distributing manifold 18 which derives ventilating or air conditioning air from a blower and ducts forming no part of the present invention. This distributor manifold 18 extends from the right-hand side of the panel to a zone immediately to the right of the steering column 16. A conduit 20 has one end connected to the left end of the manifold 18 and it is arranged to supply air to a nozzle arrangement generally indicated at 22 at the left end of the panel. A second nozzle arrangement 24 is located at the right-hand end of the panel 10 and is directly connected to the manifold 18. The two nozzle arrangements 22 and 24 are similar and, therefore, only one of them is described herein in detail.

The nozzle arrangement 22 comprises a support structure which is the fixed panel 10. This structure includes an outer member 26 in telescopic relation with an inner tubular member 28 to define an air discharge passage leading to the passenger compartment of the vehicle. The tubular member 28 cooperates with the member 26 to define a socket 30 for retaining a sphere segment 32. The socket 30 is lined with felt pieces 34 and 36 frictionally holding the sphere segment against free rotation. The friction may be varied by relative and axial adjustment of the two members 26 and 28. This adjustment, once made, may be retained by use of a set screw 38 which extends through a wall of the outer member 26 of the support structure and engages the inner member 28.

The sphere segment 32 defines a main passage 40 having a circular cross section and this passage is traversed by at least two vanes 42 and 44 having flat surfaces to define at least two discharge passages 46 and 48 extending in parallel and one discharge passage 50 extending downwardly and obliquely from the axis of the main passage 40.

There may be more than one flat vane 42 but it should be accompanied by at least one V-shaped vane 44 to bring about the effect desired.

Control of the volume of air flowing through a nozzle arrangement 22 or 24 is effected by use of a damper 52 which is fixed to a shaft 54 extending into the support structure. The damper 52 is provided with a soft rubber edging 56 better to perform its closing function. The upper end of the shaft 54 is held in fixed relation with the inner member 28 by means of a flat washer 58 and a spring fastener or stop washer 60. The lower end of the shaft 54 extends downwardly and protrudes from the underside of the fixed element 26 and is fitted with a hand knob 62 whereby the valve may be turned.

In operation, and it being assumed that the manifold 18 and conduit 20 are supplied with air by means of a blower or by the onrush of the vehicle, air will be directed through the main passage 20 in volume determined by the position of the damper 52. Air will be directed into the passenger compartment by the sphere segment 32. The arrangement of the oblique passage 50 with relation to the parallel passages 46 and 48 is such that the air is given a general flow direction but is nevertheless in a diffused condition most conducive to passenger comfort. The rotative position of the sphere segment 32 within its socket 30 about a horizontal or vertical axis or both axes may easily and conveniently be changed by manually rotating the segment to obtain the most satisfactory air distribution. The passage 50 gives more than a mere one variable direction flow. It gives diffusion in some positions and a more selective direction and concentration of flow in others. With the vanes terminating well within the sphere a large angle of divergence of the passages 48 and 50 is assured.

We claim:

A nozzle arrangement for directing air into space comprising a support structure defining an air outlet socket, a sphere segment universally movable and frictionally held in said socket and defining a main passage extending a substantial portion of the way through said segment, vanes beginning with and extending from said main passage and having surfaces defining discharge passages leading the remaining portion of the way through said segment, some of said air discharge passages being adapted to provide substantially parallel air discharge paths, and one of said air discharge passages extending obliquely from the zone in which said main passage and vanes intersect.

References Cited in the file of this patent

UNITED STATES PATENTS

| | | |
|---|---|---|
| 2,189,502 | Johnston | Feb. 6, 1940 |
| 2,513,463 | Eklund et al. | July 4, 1950 |
| 2,658,440 | Lange | Nov. 10, 1953 |
| 2,813,474 | Kurth et al. | Nov. 19, 1957 |

FOREIGN PATENTS

| | | |
|---|---|---|
| 571,761 | Great Britain | Sept. 7, 1945 |